United States Patent [19]
Wilson

[11] Patent Number: 6,102,411
[45] Date of Patent: Aug. 15, 2000

[54] CHUCK WITH LOCKING SLEEVE

[75] Inventor: Larry Wilson, Belton, S.C.

[73] Assignee: Power Tool Holders, Inc., Christiana, Del.

[21] Appl. No.: 09/134,269

[22] Filed: Aug. 14, 1998

[51] Int. Cl.$^7$ .................................................. B23B 31/12
[52] U.S. Cl. ............................................. 279/62; 279/902
[58] Field of Search .............................. 279/60–63, 902

[56] References Cited

U.S. PATENT DOCUMENTS

| | | |
|---|---|---|
| 2,928,680 | 3/1960 | Sattler . |
| 3,610,641 | 10/1971 | Ryder . |
| 4,170,366 | 10/1979 | Alessio ..................................... 279/62 |
| 4,627,627 | 12/1986 | Rohm ..................................... 279/19.3 |
| 4,648,608 | 3/1987 | Smith ......................................... 279/60 |
| 4,664,394 | 5/1987 | Theissig et al. ........................ 279/157 |
| 4,695,066 | 9/1987 | Rohm ....................................... 279/62 |
| 4,700,956 | 10/1987 | Rohm ..................................... 279/19.4 |
| 4,804,048 | 2/1989 | Porth, Jr. ................................... 173/47 |
| 5,016,892 | 5/1991 | Lafforgue et al. ....................... 279/82 |
| 5,125,673 | 6/1992 | Huff et al. ................................ 279/60 |
| 5,135,241 | 8/1992 | Huff et al. .............................. 279/142 |
| 5,145,192 | 9/1992 | Rohm ....................................... 279/62 |
| 5,145,193 | 9/1992 | Rohm ....................................... 279/62 |
| 5,145,194 | 9/1992 | Huff et al. ................................ 279/62 |
| 5,253,879 | 10/1993 | Huff et al. ................................ 279/62 |
| 5,299,814 | 4/1994 | Salpaka ................................... 279/157 |
| 5,330,204 | 7/1994 | Huff et al. ................................ 279/62 |
| 5,390,940 | 2/1995 | Morlino et al. .......................... 279/62 |
| 5,409,243 | 4/1995 | Shadek et al. ........................... 279/157 |
| 5,431,420 | 7/1995 | Huff et al. ................................ 279/62 |
| 5,452,906 | 9/1995 | Huff et al. ................................ 279/62 |
| 5,458,345 | 10/1995 | Amyot ..................................... 279/902 |
| 5,465,983 | 11/1995 | Owens et al. ........................... 279/157 |
| 5,470,084 | 11/1995 | Reibetanz et al. ..................... 279/19.3 |
| 5,476,273 | 12/1995 | Shadek et al. ............................ 279/60 |
| 5,501,473 | 3/1996 | Barton et al. ............................ 279/62 |
| 5,501,555 | 3/1996 | Muerschele et al. ............... 408/241 R |
| 5,531,461 | 7/1996 | Huff et al. ................................ 279/62 |
| 5,553,873 | 9/1996 | Salpaka et al. .......................... 279/62 |
| 5,709,392 | 1/1998 | Barton et al. ............................ 279/62 |
| 5,732,956 | 3/1998 | Huff et al. ................................ 279/62 |
| 5,816,583 | 10/1998 | Middleton ................................ 279/62 |

*Primary Examiner*—Steven C. Bishop
*Attorney, Agent, or Firm*—Nelson Mullins Riley & Scarbourough, L.L.P.

[57] ABSTRACT

A chuck includes a generally cylindrical body member having a forward section and a rearward section. The rearward section is configured to mate with a manual or powered driver. A plurality of angularly disposed passageways is formed in the forward section of the body and intersect an axial bore formed therein. The body defines a ledge portion about its outer circumference and a front face transverse to the longitudinal body axis. One of a plurality of jaws is slidably positioned in each passageway. A nut is rotatably mounted to the body rearward of the ledge portion so as to engage the jaws. A generally cylindrical sleeve engages the nut and includes a flexible protrusion extending axially rearward from an inner circumferential surface of the sleeve proximate the sleeve forward end. The protrusion has a tab portion disposed rearward of the ledge portion and projecting radially inward of the outer circumference of the ledge portion to prevent forward axial movement of the sleeve with respect to the body.

21 Claims, 3 Drawing Sheets

CHUCK WITH LOCKING SLEEVE

BACKGROUND OF THE INVENTION

The present invention relates generally to chucks for use with drills or with electric or pneumatic power drivers. More particularly, the present invention relates to a chuck of the keyless type which may be tightened or loosened by hand or by actuation of the driver motor.

Both hand and electric or pneumatic tool drivers are well known. Although twist drills are the most common tools on such drivers, the tools may also comprise screw drivers, nut drivers, burrs, mounted grinding stones, and other cutting or abrading tools. Since the tool shanks may be of varying diameter or of polygonal cross section, the device is usually provided with a chuck adjustable over a relatively wide range. The chuck may be attached to the driver by a threaded or tapered bore.

A variety of chucks have been developed in the art. In an oblique jawed chuck, a body member includes three passageways disposed approximately 120° apart from each other. The passageways are configured so that their center lines meet at a point along the chuck axis forward of the chuck. The passageways constrain three jaws which are movable in the passageways to grip a cylindrical tool shank displaced approximately along the chuck center axis. The chuck includes a nut which rotates about the chuck center and which engages threads on the jaws so that rotation of the nut moves the jaws in either direction within the passageways. The body is attached onto the drive shaft of a driver and is configured so that rotation of the body in one direction with respect to the nut forces the jaws into gripping relationship with the tool shank, while rotation in the opposite direction releases the gripping relationship. Such a chuck may be keyless if it is rotated by hand. One example of such a chuck is disclosed in U.S. Pat. No. 5,125,673 entitled "Non-impact Keyless Chuck," commonly assigned to the present assignee and the entire disclosure of which is incorporated by reference herein. Various configurations of keyless chucks are known in the art and are desirable for a variety of applications.

SUMMARY OF THE INVENTION

The present invention recognizes and addresses the foregoing considerations, and others, of prior art constructions and methods.

Accordingly, it is an object of the present invention to provide an improved chuck.

It is another object of the present invention to provide an improved mechanism for attaching the sleeve to the chuck.

These and other objects are achieved by providing a chuck for use with a manual or powered driver having a rotatable drive shaft. The chuck has a generally cylindrical body member with a forward section and a rearward section. The rearward section is configured to mate with the driver. The forward section has an axial bore formed therein and a plurality of angularly disposed passageways formed therethrough and intersecting the axial bore. The forward section also defines a ledge portion about its outer circumference and a front face transverse to the longitudinal axis of the body. A plurality of jaws are slidably positioned in each of the angularly disposed passageways. Each jaw has a jaw face formed on one side and threads formed on the other. A nut is rotatably mounted to the body rearward of the ledge so as to engage the jaw threads. A generally cylindrical sleeve has an annular open forward end and is received over the forward section of the body. The sleeve engages the nut so that when the sleeve is rotated, the nut will be rotated therewith to operate the jaws. The sleeve's forward end includes an annular lip portion extending radially inward therefrom and at least partially covering the body's front transverse face. The sleeve includes a flexible protrusion extending axially rearward from the inner circumference of the sleeve proximate the sleeve forward end. The protrusion includes a tab portion disposed rearward of the ledge portion and projecting radially inward of the outer circumference of the ledge portion to prevent forward axial movement of the sleeve with respect to the chuck body.

In one preferred embodiment, the forward end of the body is tapered so that the body's outer diameter gradually increases rearwardly from the front face. When the sleeve is mounted onto the body, the tab bears against the tapered surface so that the protrusion deflects radially outward. The tab eventually snaps into the groove.

The sleeve may further include drive ribs that engage drive rib receiving slots on the nut. When the sleeve is rotated with respect to the body, the nut is rotated therewith. Therefore, rotation of the sleeve member actuates movement of the chuck jaws in either the forward or rearward direction depending on the direction of sleeve rotation.

The accompanying drawings, which are incorporated in and constitute a part of this specification, illustrate one embodiment of the invention and, together with the description, serve to explain the principles of the invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which.

Figure 1:
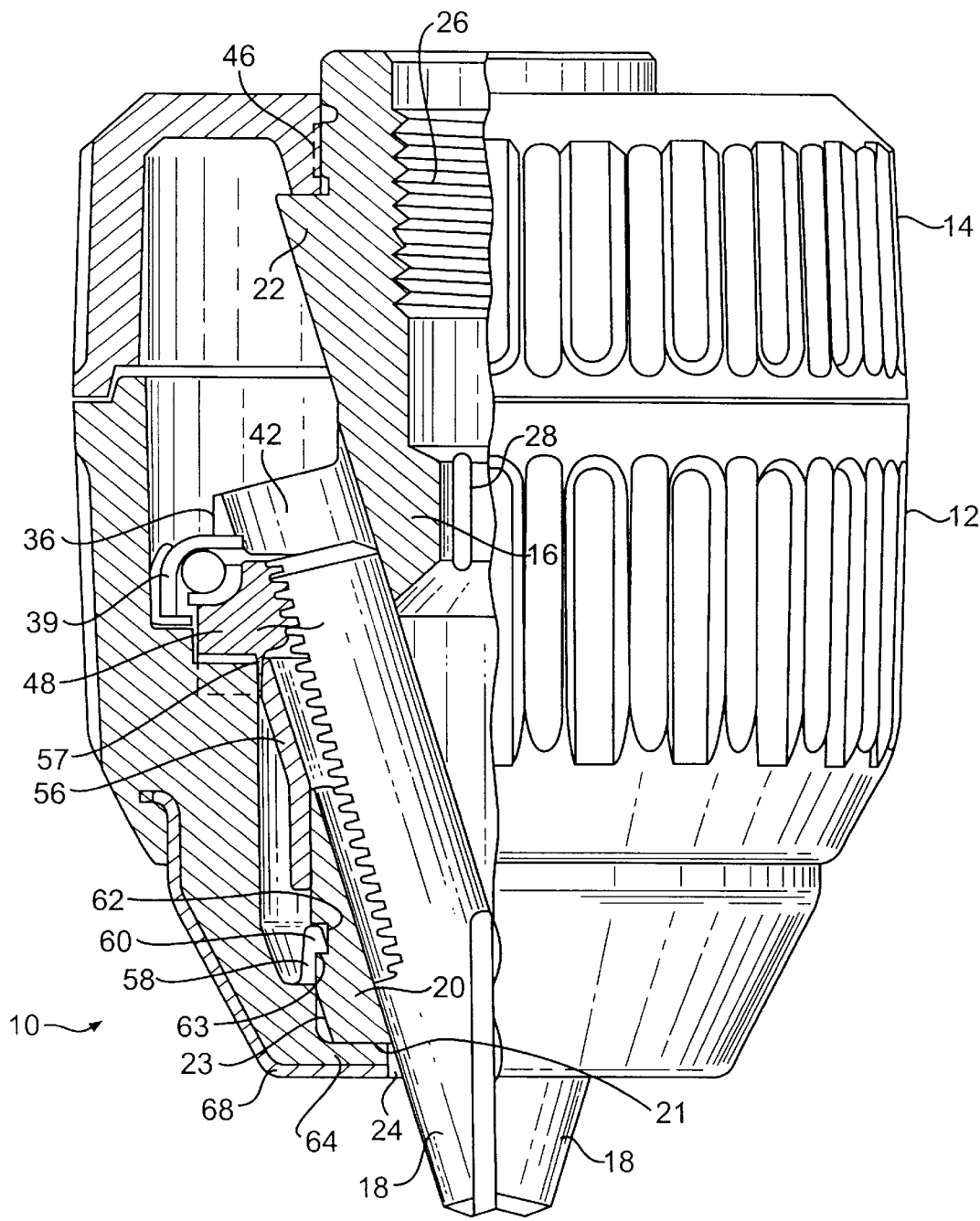
FIG. 1 is a longitudinal view, partly in section, of a chuck in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments to the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modification and variations as come within the scope of the appended claims and their equivalents.

Figure 2:
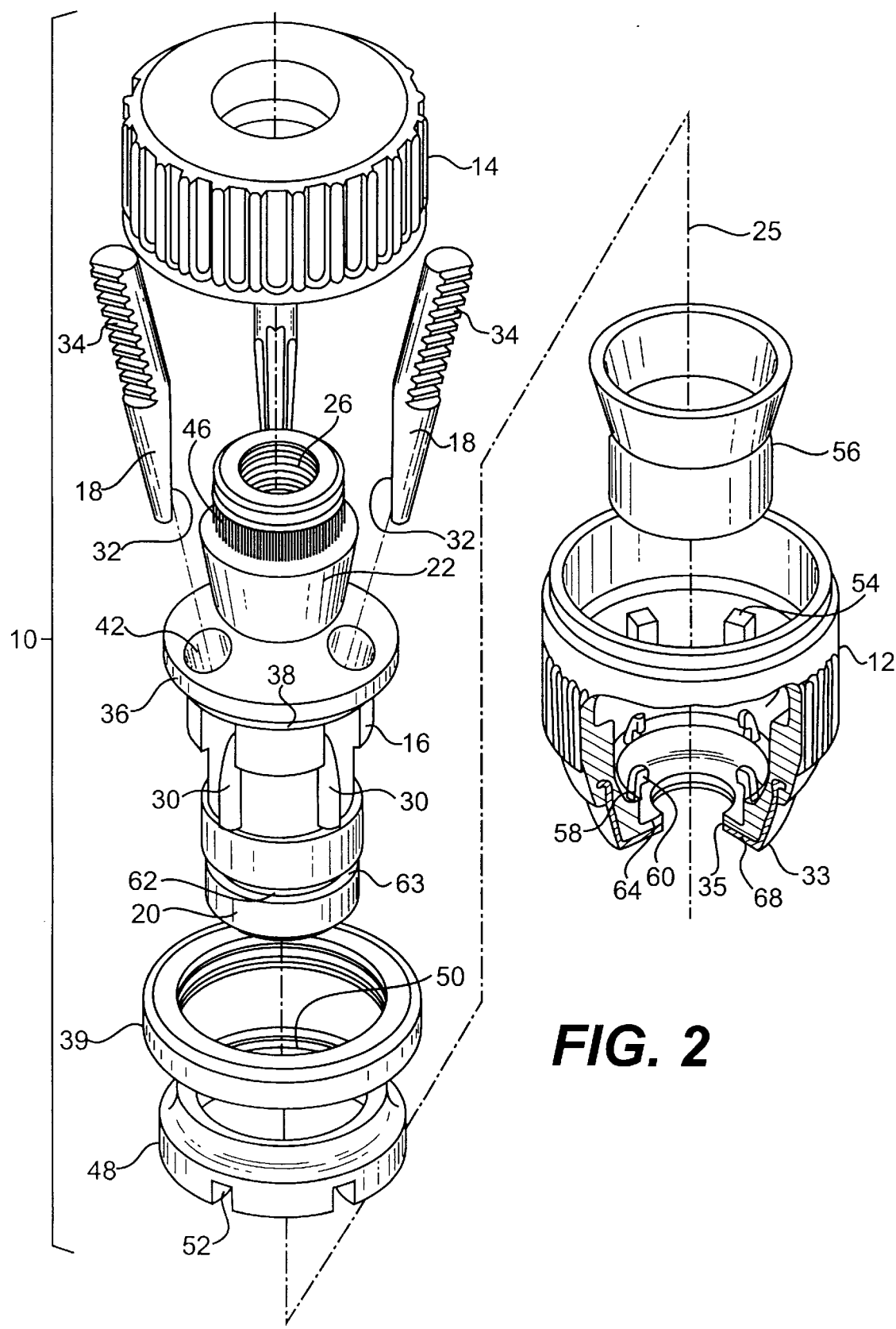
FIG. 2 is an exploded view, partly in section, of a chuck in accordance with the embodiment as in FIG. 1.

A chuck 10 in accordance with the present invention is illustrated in FIGS. 1 and 2. Chuck 10 includes a sleeve 12, a body 16 and jaws 18. Body 16 is generally cylindrical in shape and comprises a nose or forward section 20 and a tail or rearward section 22. Nose section 20 has a front face 21 transverse to the longitudinal axis 25 of body 16 and a tapered surface 23 at its forward end. An axial bore 24 is formed in the nose section. Axial bore 24 is dimensioned somewhat larger than the largest tool shank that the chuck is designed to accommodate. A threaded bore 26 is formed in tail section 22 and is of a standard size to mate with the drive shaft of a powered or hand driver (not shown). The bores 24, 26 may communicate at a central region 28 of body member 16. While a threaded bore 26 is illustrated, such bore could be replaced with a tapered bore of a standard size to mate with a tapered drive shaft.

Passageways 30 are formed in body member 16 to accommodate each jaw 18. Three jaws 18 are employed, and each jaw is separated from the adjacent jaw by an arc of approximately 120°. The axes of the passageways 30 and the jaws 18 are angled with respect to the chuck axis and intersect the chuck axis at a common point ahead of the chuck body 16. Each jaw 18 has a tool engaging face 32, which is generally parallel to the axis of the chuck body 16, and threads 34 on its opposite or outer surface. Threads 34 may be constructed in any suitable type and pitch.

As illustrated in FIGS. 1 and 2, body member 16 includes a thrust ring member 36 which, in a preferred embodiment, may be integral with the body. In an alternate embodiment, thrust ring 36 and body 16 may be separate components. Thrust ring 36 includes a plurality of jaw guideways 42 formed around its circumference to permit retraction of the jaws 18 therethrough and may also include a ledge portion 38 to receive a bearing assembly 39.

In the exemplary embodiment illustrated in FIGS. 1 and 2, body member 16 includes a rear cylindrical portion 22 with a knurled surface 46 for receipt of an optional rear sleeve 14 to be pressed thereon if so desired. It should be appreciated that rear sleeve 14 could also be retained in place by press fit without knurling, or by use of a key. It could also be retained in place by crimping, staking, riveting, threading, or any other suitable securing mechanism. Further, the chuck may be constructed with a single sleeve having no rear sleeve.

Chuck 10 includes a nut 48 that, in a preferred embodiment, is a one piece nut and that includes threads 50 for mating with threads 34 on jaws 18. Nut 48 is positioned about the body in engagement with the jaw threads so that when the nut is rotated with respect to body 16, the jaws will be advanced or retracted depending on the nut's rotational direction. Nut 48 may include slots 52 to receive drive ribs 54 so that nut 48 rotates with sleeve 12 to move the jaws.

In the illustrated embodiment, axial movement of nut 48 in the forward direction is prevented by a retaining ring 56. Retaining ring 56 is an annular cone having a cylindrical front section pressed onto front section 20 of body 16 and a frustoconical section extending rearward from the cylindrical section to engage nut 48 at 57. It should be understood, however, that other methods of axially securing the nut on the body may be used. For example, the nut may be a two-piece nut held on the body within a circumferential groove.

The outer circumferential surface of sleeve 12 may be knurled or may be provided with longitudinal ribs or other protrusions to enable the operator to grip it securely. In like manner, the circumferential surface of a rear sleeve 14, if employed, may be knurled or ribbed if desired.

As shown in FIGS. 1 and 2, an annular lip 64 extends from the forward end of sleeve 12 radially inward from an outer diameter 33 to an inner diameter 35. Lip 64 covers front transverse face 21 of body 16. A metal nose portion 68 is co-molded with front sleeve 12 and covers the forward section of sleeve 12 and annular lip 64.

The front and rear sleeves may be molded or otherwise fabricated from a structural plastic such as polycarbonate, a filled polypropylene, for example glass filled polypropylene, or a blend of structural plastic materials. Other composite materials such as, for example, graphite filled polymerics would also be suitable in certain environments. As should be appreciated by one skilled in the art, the materials for which the chuck of the present invention is fabricated will depend on the end use of the chuck, and the above materials are provided by way of example only.

As indicated above, rear sleeve 14 is secured to body 16 by the press fit at 46. Front sleeve 12, however, is secured from movement in the forward axial direction by a snap-on engagement between the sleeve and the body provided by protrusions 58. Protrusions 58 extend axially rearward from an inner circumferential surface of sleeve 12 proximate its forward end. Tabs 60 are disposed at the axially rearward ends of protrusions 58 and project inward of the outer circumference of a groove 62 in the body.

At the chuck's assembly, tabs 60 bear against tapered surface 23 so that further rearward movement of sleeve 12 with respect to body 16 causes the protrusions to outwardly deflect. Upon moving the sleeve far enough back, however, the tabs snap down into groove 62. Groove 62 forms a ledge 63 which opposes tabs 60, thereby preventing significant forward axial movement of sleeve 12. Though front sleeve 12 may move slightly in the forward direction with respect to body 16, engagement of tabs 60 with ledge 63 prevents sleeve 12 from disengaging nut 48.

The protrusions should be made of appropriate materials and in such dimensions that they will deflect outwardly during assembly yet resist forward axial pressures on the sleeve. For example, in one embodiment, the sleeve and the protrusions are made from glass-filled (40%) nylon. Each protrusion is 0.129 inches long (including the tab) and 0.036 inches thick approximately midway along the length of the tab. The inner diameter of the protrusions is constant between the main sleeve and the tab at 0.732 inches. The outer circumference of each protrusion rises (with respect to the chuck axis) at about 5° from the tab end to the main sleeve. It should be understood, however, that this is only one example and that the construction of a particular chuck may suitably vary.

Ledge 63 may be constructed in any suitable configuration. For example, the ledge may be formed in a series of spaced-apart sections so that it does not extend continuously around the body. In addition, it is not necessary that the ledge and body be unitarily constructed. The ledge may comprise a snap ring received in a suitable circumferential groove.

Figure 3:
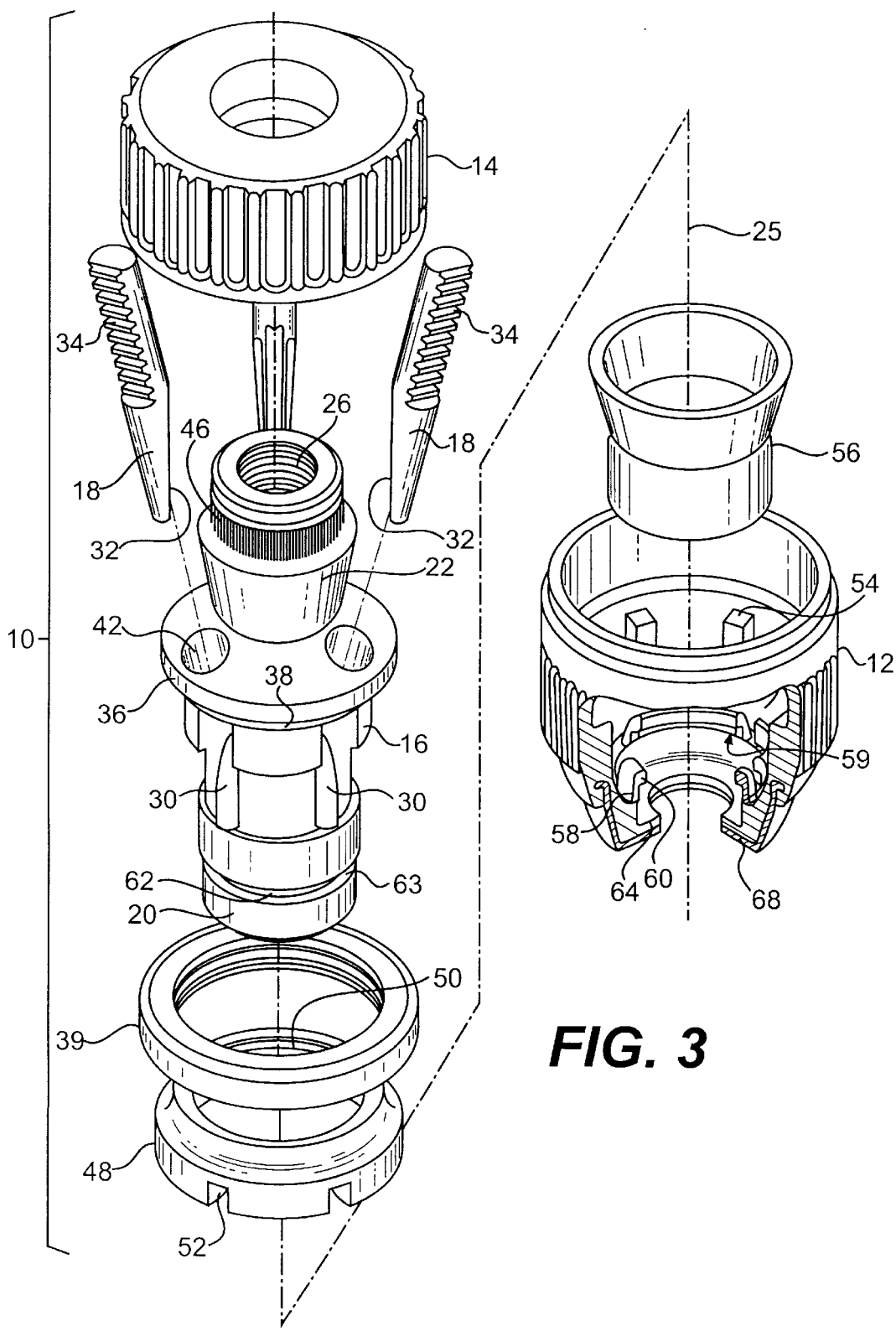
FIG. 3 is an exploded view, partly in section, of a chuck in accordance with an embodiment of the present invention.

Other constructions of protrusions 58 are also possible. For example, the protrusions may be relatively narrow finger-like projections as shown in FIG. 2 but may also comprise angularly wider projections, as in FIG. 3, that form an annular ring about the chuck axis. The ring in FIG. 3 is interrupted by four equiangularly spaced gaps 59.

It should be appreciated that rear sleeve member 14 is fixed to body 16, while front sleeve member 12 is operatively associated with nut 48 and axially secured with respect to the body to permit rotation with respect to the body. Due to the interaction between threads 34 on jaws 18 and threads 50 on nut 48, relative movement of the front and rear sleeve members 12 and 14 causes jaws 18 to be advanced or retracted, depending upon the direction of relative movement.

While one or more preferred embodiments of the present invention has been described above, it should be understood that any and all equivalent realizations of the present invention are included within the scope and spirit thereof. The depicted embodiments are presented by way of example only and are not intended as limitations on the present invention. It should be understood that aspects of the various one or more embodiments may be interchanged both in whole or in part. Therefore, it is contemplated that any and all such embodiments are included in the present invention as may fall within the literal or equivalent scope of the appended claims.

What is claimed is:

1. A chuck for use with a manual or powered driver having a rotatable drive shaft, said chuck comprising:
    a generally cylindrical body member, said body member having a forward section and a rearward section, said rearward section being configured to mate with said driver and said forward section having an axial bore formed therein, a plurality of angularly disposed passageways formed therethrough and intersecting said axial bore, a ledge portion defined about the outer circumference thereof, and a front face transverse to the longitudinal axis of said body;
    one of a plurality of jaws slidably positioned in each of said angularly disposed passageways, each of said jaws having a jaw face formed on one side thereof and threads formed on the opposite side thereof;
    a nut rotatably mounted to said body rearward of said ledge portion so as to engage said jaw threads; and
    a generally cylindrical sleeve having an annular open forward end, said sleeve being received over the forward section of said body and engaging said nut so that when said sleeve is rotated, said nut will be rotated therewith to operate said jaws, said forward end of said sleeve including an annular lip portion extending radially inward therefrom and at least partially covering said front face of said body,
    wherein said sleeve includes a flexible protrusion extending axially rearward from an inner circumferential surface of said sleeve proximate said sleeve forward end, said protrusion having a tab portion disposed rearward of said ledge portion and projecting radially inward of the outer circumference of said ledge portion to prevent forward axial movement of said sleeve with respect to said body.

2. The chuck as in claim 1, wherein said ledge portion forms a continuous annular ledge.

3. The chuck as in claim 2, wherein said annular ledge and said body are of a unitary construction.

4. The chuck as in claim 1, wherein said annular lip has an inner and an outer diameter, said inner diameter being equal to said axial bore diameter formed in said forward section of said body.

5. The chuck as in claim 1, including a plurality of said protrusions forming an annular ring about said axis of said body.

6. The chuck as in claim 5, including four said protrusions separated by equiangularly spaced gaps.

7. The chuck as in claim 1, wherein said nut is a one piece nut.

8. The chuck as in claim 1, including a thrust ring located on said body in communication with said nut to transfer rearward axial force from said nut to said body.

9. The chuck as in claim 8, including at least one anti-friction bearing disposed between said nut and said thrust ring.

10. The chuck as in claim 1, including a rear sleeve received on the rearward section of said body.

11. The chuck as is claim 1, including a decorative metal nose portion co-molded with a forward section of said sleeve.

12. The chuck as in claim 1, including a nut retaining mechanism on said body and in communication with said nut to operatively prevent axial movement of said nut in the forward direction.

13. The chuck as in claim 1, wherein the forward end of said body is tapered.

14. A chuck for use with a manual or powered driver having a rotatable drive shaft, said chuck comprising:
    a generally cylindrical body member, said body member having a forward section and a rearward section, said rearward section being configured to mate with said driver and said forward section having an axial bore formed therein, a plurality of angularly disposed passageways formed therethrough and intersecting said axial bore, an annular ledge portion defined about the outer circumference thereof, and a front face transverse to the longitudinal axis of said body;
    one of a plurality of jaws slidably positioned in each of said angularly disposed passageways, each of said jaws having a jaw face formed on one side thereof and threads formed on the opposite side thereof;
    a nut rotatably mounted to said body rearward of said ledge portion so as to engage said jaw threads;
    a generally cylindrical sleeve having an annular open forward end, said sleeve being received over the forward section of said body and engaging said nut so that when said sleeve is rotated, said nut will be rotated therewith to operate said jaws, said forward end of said sleeve including an annular lip portion extending radially inward therefrom and at least partially covering said front transverse face of said body,
    wherein said sleeve includes a plurality of flexible protrusions extending axially rearward from an inner circumferential surface of said sleeve proximate said sleeve forward end, each said protrusion having a tab portion disposed rearward of said ledge portion and projecting radially inward of the outer circumference of said ledge portion to prevent forward axial movement of said sleeve with respect to said body; and
    a thrust ring located on said body in communication with said nut to transfer rearward axial force from said nut to said body.

15. The chuck as in claim 14, including a decorative metal nose portion co-molded with a forward section of said sleeve.

16. The chuck as in claim 14, including at least one anti-friction bearing disposed between said nut and said thrust ring.

17. The chuck as in claim 14, wherein said nut is a one piece nut.

18. The chuck as in claim 14, including a nut retaining mechanism on said body and in communication with said nut to operatively prevent axial movement of said nut in the forward direction.

19. A chuck for use with a manual or powered driver having a rotatable drive shaft, said chuck comprising:
    a generally cylindrical body member, said body member having a forward section and a rearward section, said rearward section being configured to mate with said driver and said forward section having an axial bore formed therein, a plurality of angularly disposed passageways formed therethrough and intersecting said axial bore, an annular groove defined about the outer circumference of said forward section of said body, and a front face transverse to the longitudinal axis of said body;

one of a plurality of jaws slidably positioned in each of said angularly disposed passageways, each of said jaws having a jaw face formed on one side thereof and threads formed on the opposite side thereof;

a one-piece nut rotatably mounted to said body rearward of said annular groove so as to engage said jaw threads;

a generally cylindrical sleeve having an annular open forward end, said sleeve being received over the forward section of said body and engaging said nut so that when said sleeve is rotated, said nut will be rotated therewith to operate said jaws, said forward end of said sleeve including an annular lip portion extending radially inward therefrom and at least partially covering said front transverse face of said body, wherein said sleeve includes a plurality of flexible protrusions extending axially rearward from an inner circumferential surface of said sleeve proximate said sleeve forward end, each said protrusion having a tab portion projecting radially inward of the outer circumference of said groove to prevent forward axial movement of said sleeve with respect to said body;

a thrust ring in communication with said nut to transfer rearward axial force from said nut to said body;

a bearing disposed between said nut and said thrust ring;

a rear sleeve received on the rearward section of said body;

a decorative metal nose portion co-molded with a forward section of said sleeve; and a nut retaining mechanism on said body, said nut retaining mechanism including a first substantially cylindrical portion press fitted onto said body member and a second frustoconical portion in communication with said nut to transfer rearward axial force from said nut to said body.

20. The chuck as in claim 19, wherein said sleeve includes drive ribs and said nut includes drive rib receiving portions receiving said drive ribs so that said sleeve rotationally drives said nut through said drive ribs.

21. The chuck as in claim 19, wherein said frustoconical portion of said nut retaining mechanism bears on said nut.

* * * * *